(12) United States Patent
Vimpari

(10) Patent No.: US 6,577,671 B1
(45) Date of Patent: Jun. 10, 2003

(54) ENHANCED CODE ALLOCATION METHOD FOR CDMA SYSTEMS

(75) Inventor: Markku Vimpari, Oulu (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/474,312

(22) Filed: Dec. 29, 1999

(51) Int. Cl.$^7$ .......................... H04B 15/00; H04K 1/00; H04L 27/30

(52) U.S. Cl. ........................................ 375/146; 375/140

(58) Field of Search ................................ 375/140, 141, 375/146, 142, 143, 130

(56) References Cited

U.S. PATENT DOCUMENTS

| | | | | |
|---|---|---|---|---|
| 5,063,571 A | * | 11/1991 | Vancraeynest | 375/130 |
| 5,416,797 A | * | 5/1995 | Gilhousen et al. | 370/209 |
| 5,724,383 A | * | 3/1998 | Gold et al. | 375/141 |
| 5,751,761 A | * | 5/1998 | Gilhousen | 375/146 |
| 5,907,576 A | * | 5/1999 | Endo | 375/130 |
| 6,108,369 A | * | 8/2000 | Ovesjo et al. | 375/146 |
| 6,393,047 B1 | * | 5/2002 | Popovic' | 375/140 |

OTHER PUBLICATIONS

Matti Latva–Aho, Doctoral Thesis: *Advanced Receivers for Wideband CDMA Systems*, Acta Universitatis Ouluensis, Oulu, 1998, pp. 49–50.

* cited by examiner

*Primary Examiner*—Phuong Phu
(74) *Attorney, Agent, or Firm*—Harrington & Smith, LLP

(57) ABSTRACT

A method is taught for assigning spreading codes to mobile stations located within a cell, as is a CDMA communications system that operates in accordance with the method. The method includes steps of (A) assigning a set of spreading codes for use in a particular cell; (B) determining values of entries in a spreading code performance table (fixed or dynamic) based on a weighted combination of cross-correlation factors between individual ones of the spreading codes of the set of spreading codes, and also based on an auto-correlation factor of individual ones of the spreading codes of the set of spreading codes, within a delay spread range that is typical for the particular cell; and (C) assigning a spreading code from the performance table by selecting a spreading code that will cause a least amount of interference with a sub-set of already assigned spreading codes.

21 Claims, 7 Drawing Sheets

|   | 1 | 2 | 3 | 4 | 5 | 6 | 7 | 8 |
|---|---|---|---|---|---|---|---|---|
| CODE 1 | 1 | 1 | 1 | 1 | 1 | 1 | 1 | 1 |
| CODE 2 | 1 | -1 | 1 | -1 | 1 | -1 | 1 | -1 |
| CODE 3 | 1 | 1 | -1 | -1 | 1 | 1 | -1 | -1 |
| CODE 4 | 1 | -1 | -1 | 1 | 1 | -1 | -1 | 1 |
| CODE 5 | 1 | 1 | 1 | 1 | -1 | -1 | -1 | -1 |
| CODE 6 | 1 | -1 | 1 | -1 | -1 | 1 | -1 | 1 |
| CODE 7 | 1 | 1 | -1 | -1 | -1 | -1 | 1 | 1 |
| CODE 8 | 1 | -1 | -1 | 1 | -1 | 1 | 1 | -1 |

FIG. 4
PRIOR ART

|   | 1 | 2 | 3 | 4 | 5 | 6 | 7 | 8 |
|---|---|---|---|---|---|---|---|---|
| 1 | 3.1094 | 0.6094 | 0.1094 | 0.1094 | 0.0469 | 0.0469 | 0.0469 | 0.0469 |
| 2 | 0.6094 | 1.8594 | 0.1094 | 0.8594 | 0.0469 | 0.2969 | 0.0469 | 0.2969 |
| 3 | 0.1094 | 0.1094 | 1.8594 | 0.3594 | 0.0469 | 0.0469 | 1.2969 | 0.2969 |
| 4 | 0.1094 | 0.8594 | 0.3594 | 1.6094 | 0.0469 | 0.2969 | 0.2969 | 0.5469 |
| 5 | 0.0469 | 0.0469 | 0.0469 | 0.0469 | 3.1094 | 0.6094 | 0.1094 | 0.1094 |
| 6 | 0.0469 | 0.2969 | 0.0469 | 0.2969 | 0.6094 | 1.8594 | 0.1094 | 0.8594 |
| 7 | 0.0469 | 0.0469 | 1.2989 | 0.2969 | 0.1094 | 0.1094 | 1.8594 | 0.3594 |
| 8 | 0.0469 | 0.2969 | 0.2969 | 0.5469 | 0.1094 | 0.8594 | 0.3594 | 1.6094 |
|   | 0.145114 | 0.323686 | 0.323686 | 0.3594 | 0.145114 | 0.323686 | 0.323686 | 0.3594 |

THESE TWO CODES SHOULD BE PREFERRED

ALLOCATING CODES 3 AND 7 SIMULTANEOUSLY SHOULD BE AVOIDED

ENHANCED CODE ALLOCATION METHOD FOR CDMA SYSTEMS

FIELD OF THE INVENTION

This invention relates generally to spread spectrum, code division/multiple access (CDMA) wireless communications systems and, more particularly, to method and apparatus for optimizing the allocation of spreading codes to mobile subscriber terminals.

BACKGROUND OF THE INVENTION

Next generation cellular telecommunications systems (i.e., so-called third generation (3G) systems), such as the Universal Mobile Telephone System (UMTS) in Europe and CDMA2000 system in the United States, will be based on wide bandwidth CDMA technology. These systems are expected to enable the simultaneous transmission of real-time video streams, packet mode data and/or speech in the same cell and on the same frequency channel.

The current second generation systems were originally designed for low bit rate circuit switched services (speech). In one well known second generation CDMA system (TIA/EIA IS-95) there is only one, relatively long spreading factor that is used. That is, while there are many spreading codes in use, there is only one spreading factor or code length.

However, for the proposed third generation systems the implementation of high bit rate services will require that shorter spreading codes be used (e.g., spreading sequences as short as four chips). An alternate method for implementing high bit rate services is to employ multi-code transmissions, wherein a plurality of logical links and spreading codes are allocated for the same connection (user and service), and wherein the data stream is split and transmitted in parallel over the plurality of logical links. In some cases both methods can be used together (i.e., short spreading sequences and multiple parallel links.)

In theory, both of these methods provide nearly identical spectrum efficiency and link performance. However, the first method (i.e., shorter spreading codes or decreased spreading factor) is preferable from the mobile station (MS) point of view, as the complexity and the processing requirements, and thus the current consumption, are reduced as compared to the use of multiple links and spreading codes for one connection.

One major disadvantage to the use of the shorter spreading codes (decreased spreading factor) is that as the spreading codes are made shorter, their performance in an actual multipath channel is decreased. This is due primarily to poor auto-correlation and cross-correlation characteristics of short spreading codes, as compared to longer spreading codes.

Figure 1A:
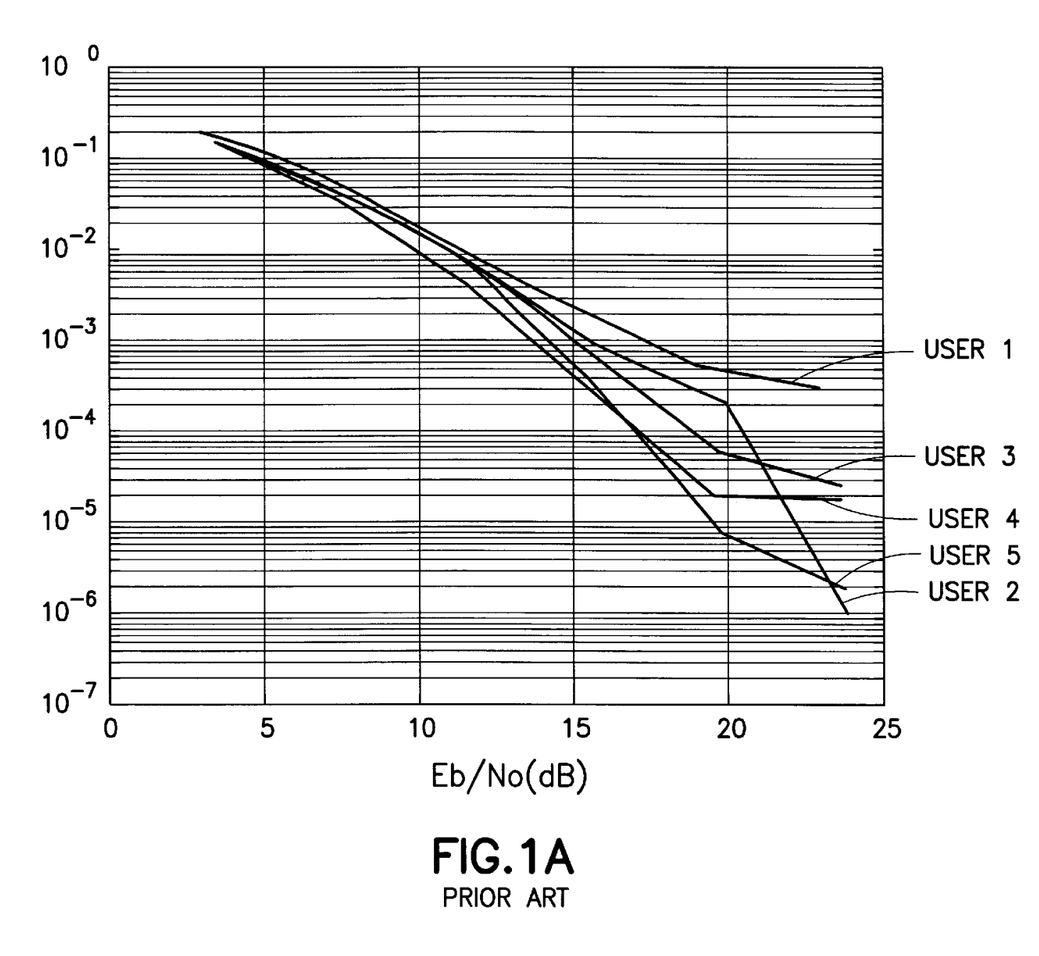
FIG. 1A is a graph that illustrates the results of a simulation of the effect of unequal and non-optimized inter-code interference in a wide bandwidth CDMA communication system.

FIG. 1A is a graph that illustrates the results of a simulation of the effect of unequal and non-optimized inter-code interference in a wide bandwidth CDMA communication system. As can be seen, the performance of different links can vary dramatically. This is due to dissimilar spreading code correlation characteristics in a multipath environment. The codes used in this simulation were derived from an orthogonal Walsh tree.

This problem was mitigated in the currently deployed second generation CDMA systems by the use of long scrambling codes (as opposed to spreading codes) to average cross-correlation effects between the spreading codes.

It should be noted that in the presently envisioned third generation CDMA systems the use of long scrambling codes has also been proposed so as to average the interferences resulting from dissimilar spreading code correlation characteristics in a multipath environment.

Figure 1B:
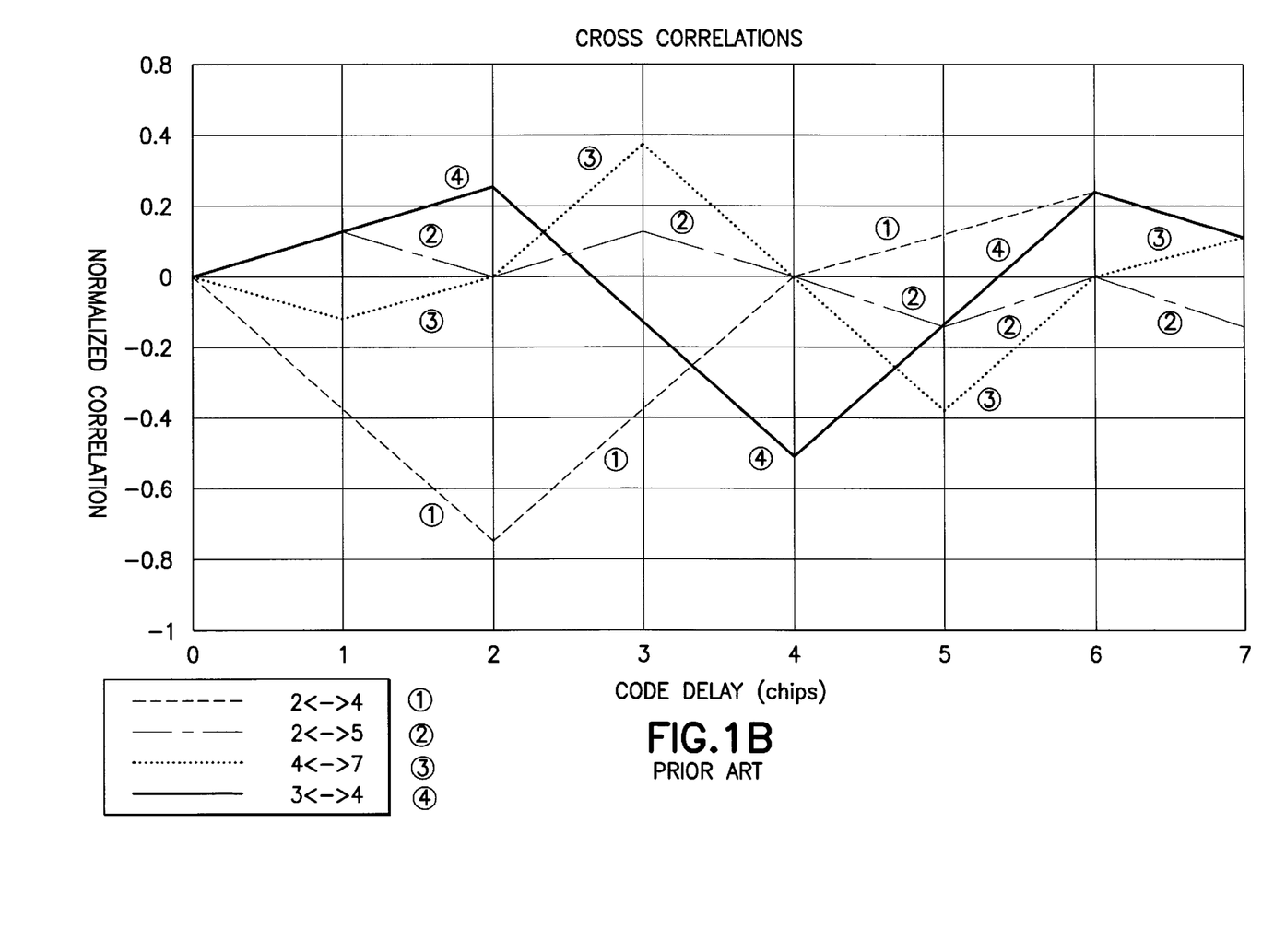
FIG. 1B is a graph showing cross-correlation functions for short (8-bit) Walsh spreading codes as a function of code delay, wherein for clarity only four of a possible 56 cross-correlation functions are depicted, one for good, two for moderate, and one for poor cross-correlation results.

FIG. 1B is a graph showing cross-correlation functions for short (8-bit) Walsh spreading codes as a function of code delay, wherein for clarity only four of a possible 56 cross-correlation functions are depicted, one for good, two for moderate, and one for poor cross-correlation results.

Figure 2:
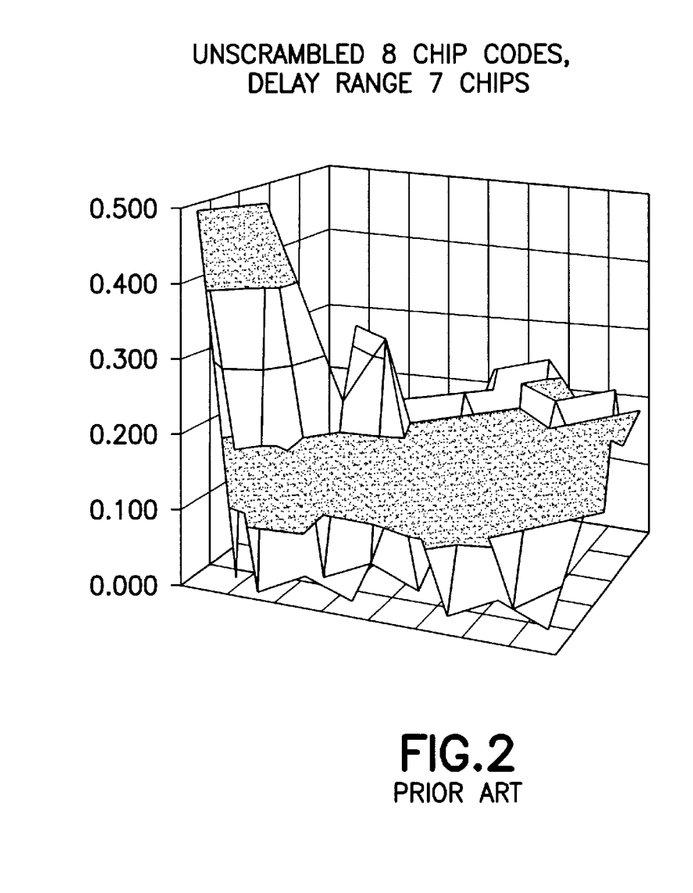
FIG. 2 illustrates the cross-correlation results for an eight chip long Walsh code without the use of a long scrambling code (delay range seven chips)
Figure 3:
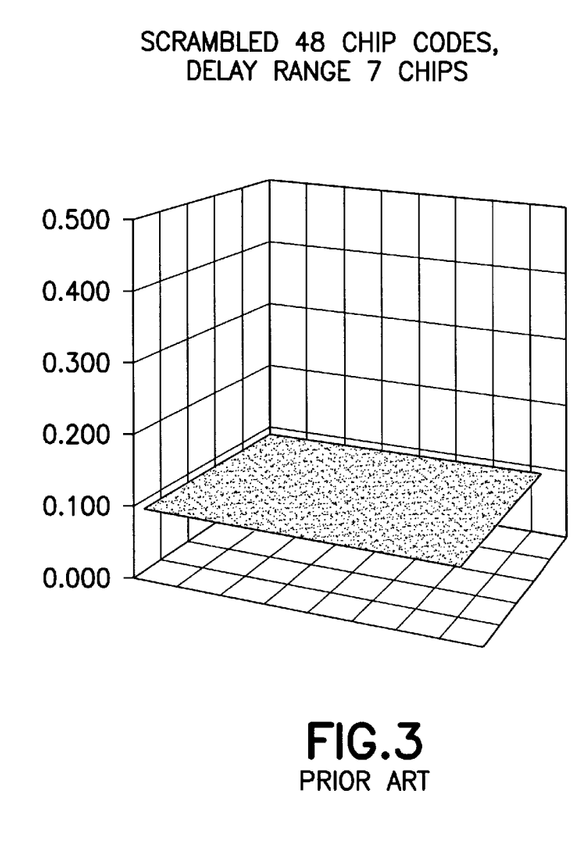
FIG. 3 illustrates a significant reduction in maximum interference that results when the long scrambling code is used.

FIG. 2 illustrates the cross-correlation results for an eight chip long Walsh code without the use of a long scrambling code (delay range seven chips), while FIG. 3 shows the significant averaging in interference that results when the long scrambling code is added.

It can be appreciated that in the second generation CDMA communications systems the use of long scrambling codes was adequate to overcome the cross-correlation effects of short spreading codes in a multipath environment. However, the second generation CDMA systems are essentially symmetrical service systems optimized for speech transmissions, wherein the same bit rate is used in the uplink (mobile station to base station) and in the downlink (base station to mobile station) directions. In such symmetrical systems the major system capacity limitation has traditionally been limited by the uplink, where errors in the mobile station power control has been the primary problem. However, in the proposed third generation systems the downlink will be managed separately from the uplink, as many data services are very unsymmetrical. For example, a user performing WWW-browsing may have a very low bit rate requirement for the uplink (e.g., one sufficient for handling only low speed manual character input), while the downlink may have a very high bit rate requirement (e.g., if the user has requested a WWW page containing graphics and/or video and audio content).

Figure 4:
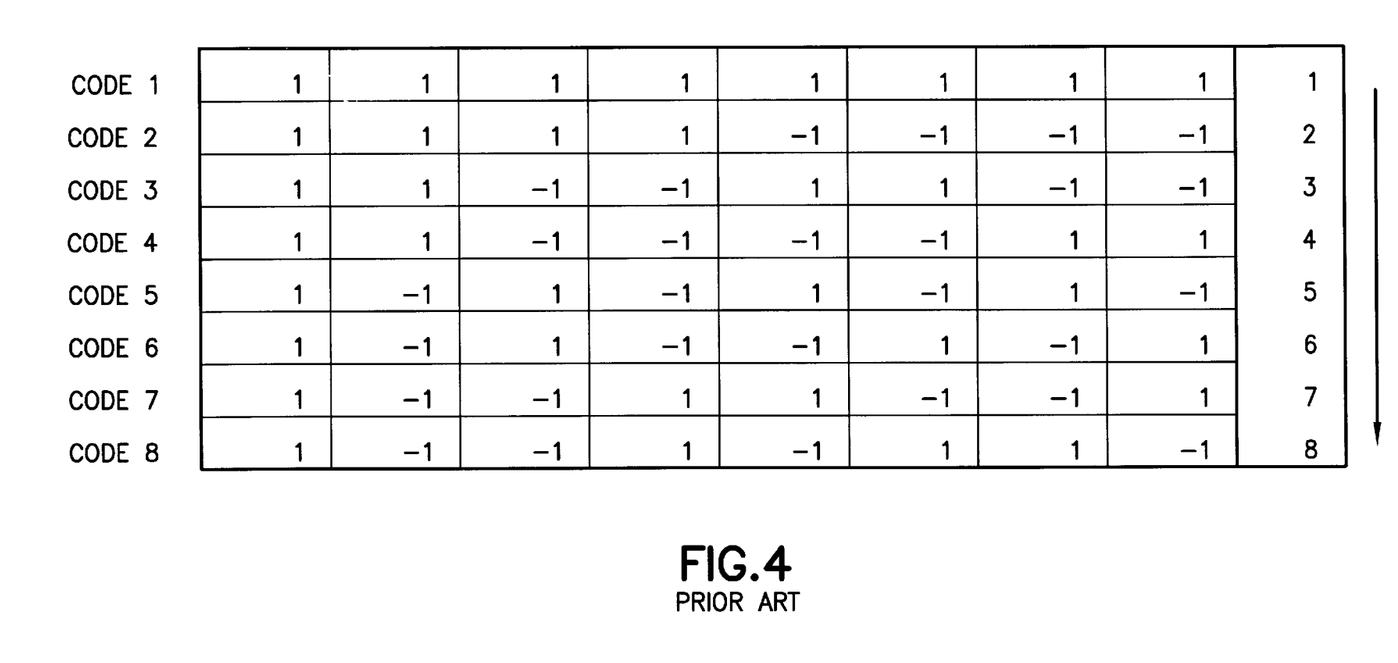
FIG. 4 depicts a conventional technique for allocating spreading codes from a table in ascending 'natural' or random order.

Referring to FIG. 4, in the conventional second generation CDMA systems the spreading codes are typically allocated to users in a random or 'natural' order. In the natural order allocation technique, the spreading codes can simply be allocated in first-free-location-found order from a table containing spreading codes. These spreading codes are typically stored in the table in the order in which they are output by a generator polynomial.

The inventor has recognized that should it be desired to not use the long scrambling code, which guarantees moderate performance for all spreading code combinations, then this conventional spreading code allocation technique will not be optimum for assigning spreading codes in the third generation (and higher) CDMA telecommunications systems.

OBJECTS AND ADVANTAGES OF THE INVENTION

It is a first object and advantage of this invention to provide an improved technique for allocating spreading codes to users.

It is another object and advantage of this invention to provide an optimized spreading code assignment technique in a CDMA system that does not employ scrambling codes.

SUMMARY OF THE INVENTION

The foregoing and other problems are overcome and the objects of the invention are realized by methods and apparatus in accordance with embodiments of this invention.

A method is disclosed for assigning spreading codes to mobile stations located within a cell, as is a CDMA communications system that operates in accordance with the method. The method includes steps of (A) assigning a set of spreading codes for use in a particular cell; (B) determining values of entries in a spreading code performance table based on a weighted combination of cross-correlation factors between individual ones of the spreading codes of the set of spreading codes, and also based on an auto-correlation factor of individual ones of the spreading codes of the set of spreading codes, within a delay spread range that is typical for the particular cell; and (C) assigning a spreading code from the performance table by selecting a spreading code that will cause a least amount of interference with a sub-set of already assigned spreading codes. Preferably the data to be transmitted is not scrambled with a scrambling code, but is only spread using the assigned spreading code. The steps of determining and assigning can be performed by a Radio Resource (RR) Management software module or function that runs on a data processor of a base station controller.

The step of determining the values of the entries in the performance table may be further based on a consideration of a simultaneous presence of high data rate mobile stations, within the delay spread range that is typical for the particular cell. The step of determining can establish a fixed performance table or a dynamic performance table, wherein the values of the entries are updated in real-time or substantially real-time.

The spreading code can be assigned to a mobile station by a spreading code handover technique, wherein an already assigned spreading code is unassigned and replaced by a newly assigned spreading code. In this case a spreading code handover is performed upon an occurrence of a condition wherein an amount of performance improvement that will be experienced by replacing an already assigned spreading code with a new spreading code exceeds a threshold value.

Preferably the step of assigning assigns a spreading code that is selected to minimize an RMS correlation metric error value for all, already assigned spreading codes.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

In accordance with the teachings of this invention, spreading codes are allocated to mobile stations in accordance with calculated, or pre-calculated, or simulated link performance data. It is preferred that the calculations or simulations consider, for example, cross-correlation factors, or auto-correlation factors, or more preferably a weighted combination of both cross-correlation and auto-correlation factors. These factors are considered as a function of the simultaneous presence of high data rate users within a delay spread range that is typical for a particular cell. The cell could be any one of a rural cell, an urban cell, a microcell, or an indoor picocell.

Suitable analytical tools, such as one known as MatLab™ (Mathworks Inc., http://www.mathworks.com/), or deterministic tools such as a commercially available link-level simulator known as Cossap™ (Synopsys Inc., http://www.synopsys.com/), can be used to generate values stored in a spreading code allocation table. Various analytical spreading code selection algorithms can then be merged with Radio Resource (RR) management and control functions for assigning spreading codes in an optimum manner.

In accordance with an aspect of this invention, long scrambling codes are not used, as they have been found to decrease the performance of "best" spreading code pairs, and only a few high bit rate codes are required in one CDMA carrier.

Figure 5:
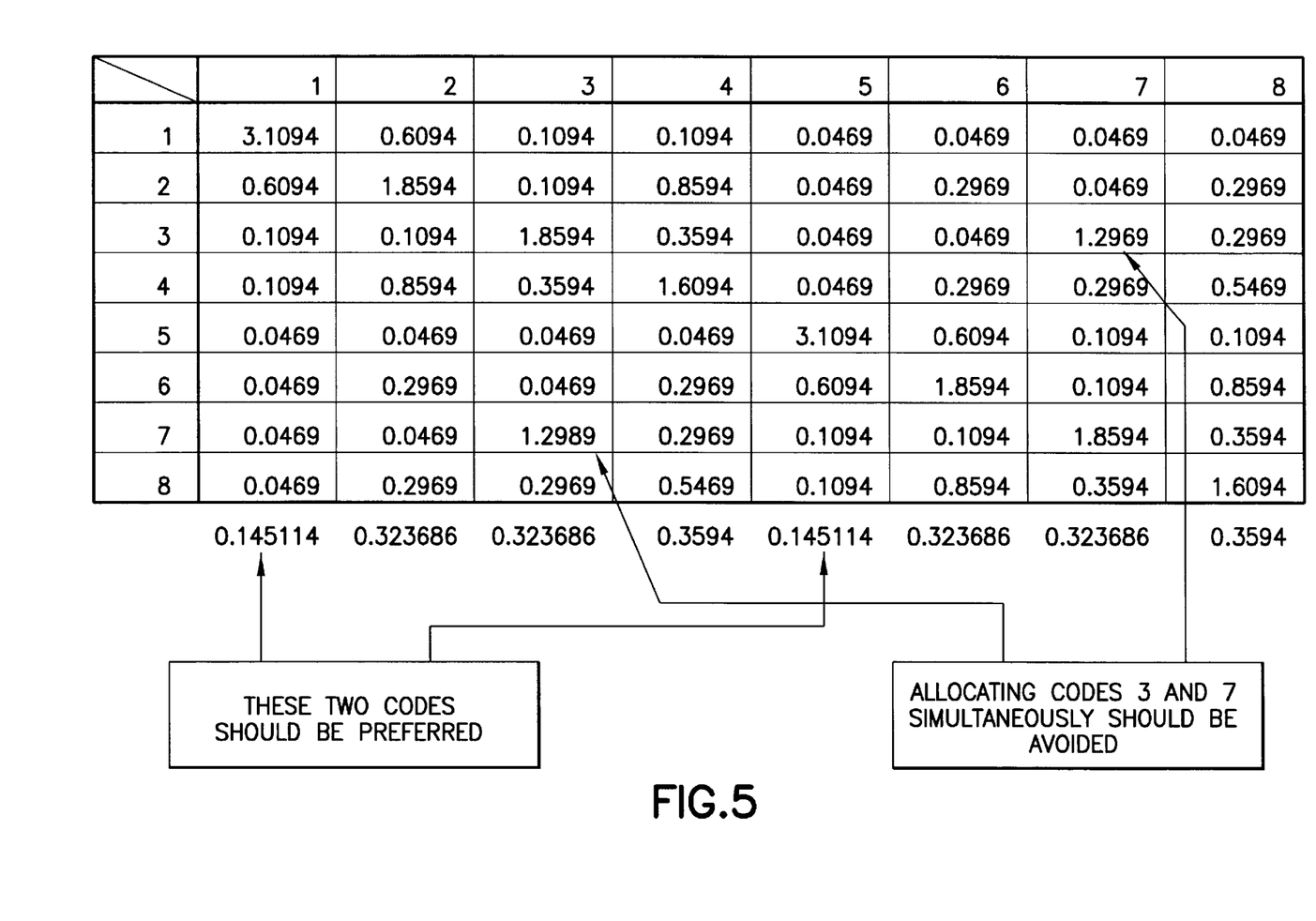
FIG. 5 illustrates an exemplary Table of results from the calculation of a RMS correlation metric over a 0–6 chip delay range.

Referring to FIG. 5, one result is the generation of a Table wherein, by example, a Root Mean Square (RMS) correlation metric calculated over, for example, a 0–6 chip delay range. The actual delay range is preferably made a function of the radius of the cell of interest, as a larger cell will typically have a larger chip delay range than a smaller cell.

It can be noted that the spreading code auto-correlation results are found along the diagonal (code 1 vs. code 1, code 2 vs. code 2, . . . ,etc.), but these auto-correlation results are not as relevant to spreading code allocation as the cross-correlation results.

In one exemplary spreading code allocation approach the spreading codes are selected from the Table in a fixed order based on the spreading code performance metrics.

Discussing this aspect of the invention now in further detail, for the RMS cross-correlation calculation the spreading codes are multiplied at all phases with the desired delay spread. That is, the first spreading code is delayed 0-d chips, multiplied with the second spreading code, and all of the multiplication results are summed together.

The auto-correlation results are calculated in the same manner, but at delays of 1-d chips (the auto-correlation at zero chip delay is the correlation result.)

The cross-correlation Table could be calculated by any of a number of suitable numeric manipulation techniques, including MatLab™, MathCAD™ (by MathSoft Inc., http://www.mathsoft.com/), MS Excels™, etc. When a dynamic technique is used, the selected technique can be embedded in the software of the Base Station Controller (BSC) 16 (see FIG. 6), and can be simply implemented as C functions.

As was noted above, the auto-correlation results are found in the diagonal cells of the cross-correlation Table. In this example the auto-correlation results are not used in the overall code performance calculations (the mean value is found in the bottom line of each column). However, the auto-correlation results may be used with proper weighting, such as by multiplying the auto-correlation value by a factor of, for example, 0.1 before including it to the mean value. The proper value weighting factor is a function of receiver type and other system parameters. Link level simulations can be employed to determine an optimal value of the weighting factor. In general, if the weighting factor is optimized the curves of FIG. 1 will track one another without significant deviation.

In another exemplary embodiment new spreading codes are allocated in such a way as to minimize the overall metric calculated for all, already allocated spreading codes, as well as new candidate codes. In practice, this implies that the simultaneous allocation of the worst spreading code pair (e.g., 3 and 7) is avoided.

Figure 6:
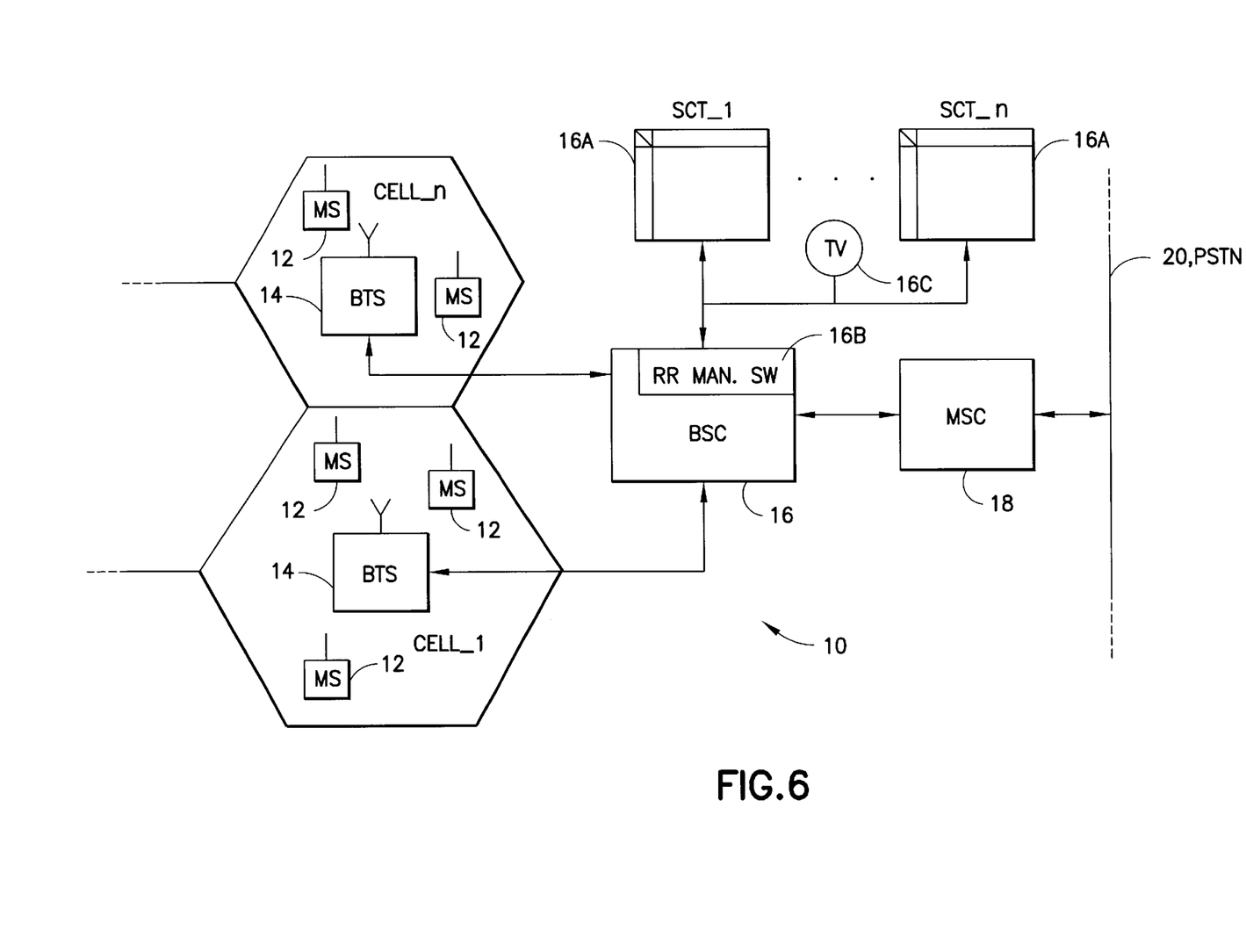
FIG. 6 is a simplified block diagram of a CDMA cellular telecommunications system in accordance with a presently preferred embodiment of this invention.

FIG. 6 is a simplified block diagram of a CDMA cellular telecommunications system 10 in accordance with a presently preferred embodiment of this invention. A plurality of mobile stations (MSs) 12 are located within cells (Cell_1, ..., Cell_$n$) each of which is associated with a base transceiver station (BTS). The various BTS 14 are coupled to a base station controller (BSC) 16, which in turn is coupled to a mobile switching center (MSC) 18. The MSC 18 provides connections to external telephone and data networks, such as the public switched telephone network (PSTN) 20, as well as to packet data networks, etc. In other embodiments each BTS 14 may have its own BSC 16.

In accordance with an aspect of this invention the BSC 16 has access to a plurality of spreading code tables (SCTs) 16A, one for each of the cells Cell_1 to Cell_$n$. In this case it is assumed that the cells do not have the same radius and propagation (multipath) characteristics, and thus different delay spreads can be experienced in different cells. Furthermore, different sets of spreading codes may be assigned in adjacent cells, thus requiring a Table for each set of spreading codes. Each of the SCTs 16A may have a format, and the value of its entries derived, in a manner similar to that shown in FIG. 5.

The set of SCTs 16A are bidirectionally coupled to a Radio Resource (RR) Management software (SW) module 16B of the BSC 16 that runs on a BTS data processor, and are maintained by the RR Management SW module 16B. Likewise, spreading codes for individual ones of the mobile stations 12 are allocated by the RR Management SW module 16B from the SCT 16A that is associated with the cell that contains the mobile station 12.

In one embodiment the SCTs 16A are precalculated and fixed. In another embodiment the SCTs 16A are calculated on the fly, in a dynamic manner, and are thus more reflective of current conditions (e.g., codes that are already assigned, the presence or absence of other interference sources, the types of traffic that the cell(s) are currently supporting, etc.)

It is within the scope of the teaching of this invention to use intercell handovers to reallocate the spreading codes of existing communication links when better spreading codes become available. For example, when tearing down a link for one of the mobile stations 12 the RR Management SW 16B makes a determination if the freed (relinquished) spreading code would provide better performance (reduced interference with already assigned codes) than one of the spreading codes that is currently assigned to another mobile station 12. If this is found to be true, then the mobile station 12 that is using the less optimum spreading code is commanded through suitable prearranged signalling to begin using the more optimum spreading code, thereby performing a spreading code handover (intercell). In this case an already assigned spreading code is unassigned and replaced by a newly assigned spreading code. In order to avoid extensive handover signaling within the cells it is preferred to employ a fixed or dynamic threshold value to trigger spreading code reallocation and handover. That is, the improvement in a particular RMS correlation metric that results from the use of one spreading code, and hence the reduction in interference, should exceed some threshold value (TV) 16C (either fixed or dynamic) before the spreading code handover performed by the RR Management SW 16B is triggered.

For example, and when the threshold TV is made dynamic, one consideration can be the current loading in the cell, wherein at heavily loaded times it would be desirable to reduce the amount of handover signalling more so than when the cell is lightly loaded. Further by example, another consideration could be the loading of neighbor cells, that is, how much interference is due to traffic within the cell, and how much from traffic in neighbor cells.

Further in this regard, these teachings use a single or a plurality of (fixed or dynamic) performance Tables 16A to allocate spreading codes. A single Table is preferred from a complexity and memory consumption point of view, but using dynamic Tables, i.e., a performance Table selected according to already allocated codes, decreases the number of code re-allocation operations (intercell handovers), when allocations are fragmented, that is, no longer optimal.

For example, the RR Management SW 16B employs calculated correlation values between all spreading codes to select the spreading code that minimizes an error value (e.g., an RMS error value) for all, already allocated spreading codes. When the spreading code length is set at some reasonable value this is preferred, as the amount of processing load is kept within reasonable bounds. In fact, this approach is used in FIG. 5 for relatively short eight chip Walsh spreading codes.

As was stated above, it is within the scope of these teachings to use pre-calculated SCT(s) 16A, or to calculate these Table(s) on the fly (in real-time or approximately real-time.) A selection between these two techniques can be based on the memory consumption of precalculated Table(s) versus the processing requirements to calculate them. Both are a function of spreading code length(s), as well as the fixed/dynamic Table technique discussed above.

It should be noted that the auto-correlation of the unscrambled spreading codes also affects the performance of a receiver (typically a RAKE receiver) in a multipath environment. As such, it is preferred to not base the spreading code selection (and performance calculations) solely on the cross-correlation characteristics between a set of spreading codes. Theoretically poor cross-correlation characteristics relate to good auto-correlation characteristics, and vice versa, but as it can be seen in FIG. 1A that the traditional RAKE receiver is more sensitive to cross-correlation than to auto-correlation characteristics. As such, and as was discussed above, the spreading code selection. is preferably based on combined (cross-correlation and auto-correlation) metrics.

It should also be noted that the RMS metric is most typically used, and while other metrics exist, the RMS metric is preferred.

Figure 7:
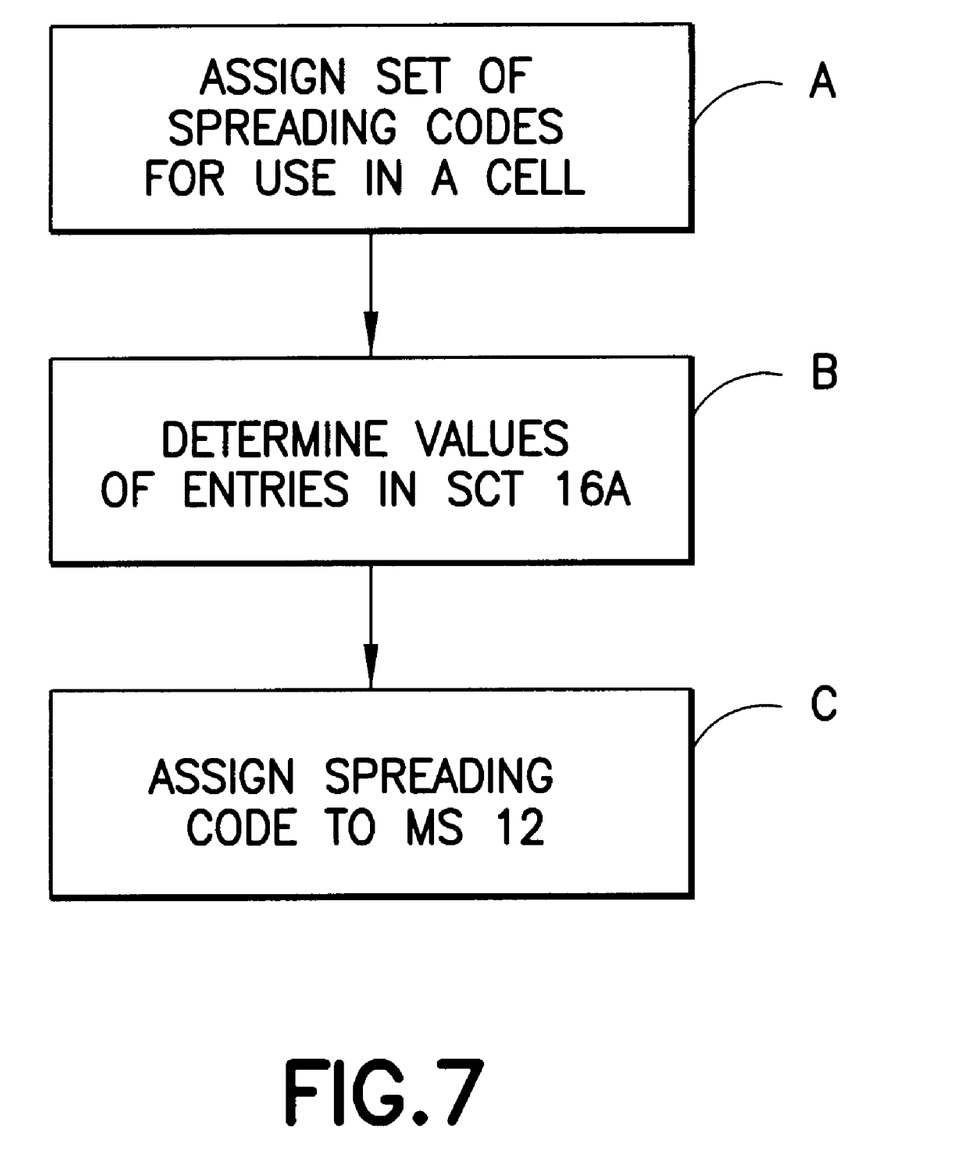
FIG. 7 is a logic flow diagram illustrating a method of this invention.

Based on the foregoing description, and referring now to FIG. 7, it should be apparent that a method has been disclosed for assigning spreading codes to the mobile stations 12 located within a cell. The method includes steps of (A) assigning a set of spreading codes for use in a particular cell; (B) determining values of entries in a spreading code performance table (SCT 16A) based on a weighted combination of cross-correlation factors between individual ones of the spreading codes of the set of spreading codes, and also based on an auto-correlation factor of individual ones of the spreading codes of the set of spreading codes, within a delay spread range that is typical for the particular cell; and (C) assigning a spreading code from the SCT 16A by selecting a spreading code that will cause a least amount of interference with a sub-set of already assigned spreading codes. The steps of determining and assigning can be performed by the Radio Resource (RR) Management software module or function 16B that runs on a data processor of the BSC 16.

One advantage that results from employing the teachings of this invention is that one can use an advanced, linear equalizer type of receiver (LMMSE), i.e., one that is capable of interference suppression without the need to demodulate all users. While the LMMSE can theoretically be used as well with long scrambling codes, in actuality the implementation may not be technically feasible, and furthermore the performance of the LMMSE, when using long scrambling codes, would be poor at high mobile station speeds.

The use of this invention, which enables shorter spreading factors to be employed without the use of the conventional long scrambling codes, thus also makes the use of advanced receiver types, such as the LMMSE, technically feasible.

It should be noted that while the invention has been described in the context of assigning a spreading code to a mobile station 12 requiring same, in the case where multiple parallel links (and spreading codes) are used to convey a high rate transmission, then a plurality of spreading codes can be selected from the SCT 16A and assigned for use by a single mobile station 12.

Thus, while the invention has been particularly shown and described with respect to preferred embodiments thereof, it will be understood by those skilled in the art that changes in form and details may be made therein without departing from the scope and spirit of the invention.

What is claimed is:

1. A method for assigning spreading codes to mobile stations located within a cell, comprising steps of:
   assigning a set of spreading codes for use in a particular cell;
   determining entries in a spreading code performance table based on a weighted combination of cross-correlation factors between individual ones of the spreading codes of the set of spreading codes and also an auto-correlation factor of individual ones of the spreading codes of the set of spreading codes, within a delay spread range that is typical for the particular cell; and
   assigning a spreading code from the performance table by selecting a spreading code that will cause a least amount of interference with a sub-set of already assigned spreading codes.

2. A method as in claim 1, wherein the step of determining is further based on a consideration of a simultaneous presence of high data rate mobile stations within the delay spread range that is typical for the particular cell.

3. A method as in claim 1, wherein the step of determining establishes a fixed performance table.

4. A method as in claim 1, wherein the step of determining establishes a dynamic performance table.

5. A method as in claim 1, wherein the step of assigning assigns the spreading code to a mobile station by a spreading code handover, wherein an already assigned spreading code is unassigned and replaced by a newly assigned spreading code.

6. A method as in claim 1, wherein data to be transmitted is not scrambled with a scrambling code, but is only spread using the assigned spreading code.

7. A method as in claim 1, wherein the steps of determining and assigning are performed by a base station controller.

8. A method as in claim 1, wherein the steps of determining and assigning are performed by a Radio Resource Management function of a base station controller.

9. A method as in claim 1, wherein the step of assigning assigns the spreading code to a mobile station by a spreading code handover upon an occurrence of a condition wherein an amount of performance improvement that will be experienced by replacing an already assigned spreading code with a new spreading code exceeds a threshold value.

10. A method as in claim 1, wherein the step of assigning assigns a spreading code that is selected to minimize an RMS correlation metric error value for all, already assigned spreading codes.

11. A code division, multiple access wireless communications system, comprising:
    at least one base transceiver station (BTS) serving a cell;
    a plurality of mobile stations (MSs) within said cell; and
    a base station controller (BSC) coupled to said BTS, said BSC comprising a data processor for assigning individual ones of spreading codes selected from a set of spreading codes to mobile stations within said cell, said BSC data processor determining values for entries in a spreading code performance table based on a weighted combination of cross-correlation factors between individual ones of the spreading codes of the set of spreading codes and also an auto-correlation factor of individual ones of the spreading codes of the set of spreading codes, within a delay spread range that is typical for said cell, and for assigning a spreading code from the performance table by selecting a spreading code that will cause a least amount of interference with a sub-set of already assigned spreading codes.

12. A system as in claim 11, wherein said BSC data processor further determines values for said entries based on a consideration of a simultaneous presence of high data rate mobile stations within the delay spread range that is typical for said cell.

13. A system as in claim 11, wherein said BSC data processor establishes a fixed performance table.

14. A system as in claim 11, wherein said BSC data processor establishes a dynamic performance table.

15. A system as in claim 11, wherein said BSC data processor assigns a spreading code to a mobile station by a spreading code handover technique, wherein an already assigned spreading code is unassigned and replaced by a newly assigned spreading code, and wherein a spreading code handover is performed upon an occurrence of a condition wherein an amount of performance improvement that will be experienced by replacing the already assigned spreading code with the newly assigned spreading code exceeds a threshold value.

16. A system as in claim 15, where the threshold value is a static value that remains fixed during the operation of the system.

17. A system as in claim 15, where the threshold value is a dynamic value that varies during the operation of the system.

18. A system as in claim 15, where the value of the threshold is established so as to avoid excessive spreading code handovers.

19. A system as in claim 11, wherein data to be transmitted is not scrambled with a scrambling code, but is only spread using the assigned spreading code.

20. A system as in claim 11, wherein said BSC data processor executes a Radio Resource Management function.

21. A system as in claim 11, wherein the BSC data processor assigns a spreading code that is selected to minimize an RMS correlation metric error value for all, already assigned spreading codes.

* * * * *